(12) United States Patent
Puerini et al.

(10) Patent No.: US 7,747,483 B1
(45) Date of Patent: Jun. 29, 2010

(54) SYSTEM AND METHOD FOR CREATING A BUILD SET AND BILL OF MATERIALS FROM A MASTER SOURCE MODEL

(75) Inventors: Gary Ronald Puerini, Saunderstown, RI (US); Richard Kashian, Woburn, MA (US); David Doherty, Winchester, MA (US); Phelan James Hinson, High Point, NC (US)

(73) Assignee: MITEK Holdings, Inc., Wilmington, DE (US)

( * ) Notice: Subject to any disclaimer, the term of this patent is extended or adjusted under 35 U.S.C. 154(b) by 292 days.

(21) Appl. No.: 12/043,304

(22) Filed: Mar. 6, 2008

Related U.S. Application Data

(60) Provisional application No. 60/893,301, filed on Mar. 6, 2007.

(51) Int. Cl.
*G06F 17/50* (2006.01)
*G06F 17/30* (2006.01)

(52) U.S. Cl. .................................. 705/29; 707/2; 707/7
(58) Field of Classification Search ..................... None
See application file for complete search history.

(56) References Cited

U.S. PATENT DOCUMENTS

| | | | |
|---|---|---|---|
| 5,307,261 A | 6/1991 | Maki et al. | |
| 5,668,736 A | 1/1995 | Douglas et al. | |
| 6,813,610 B1 | 10/1996 | Bienias | |
| 6,094,654 A * | 7/2000 | Van Huben et al. | 707/8 |
| 2002/0032611 A1 * | 3/2002 | Khan | 705/26 |
| 2002/0129001 A1 * | 9/2002 | Levkoff et al. | 707/1 |
| 2004/0138775 A1 | 7/2004 | Bigelow | |
| 2004/0205519 A1 | 10/2004 | Chapel et al. | |
| 2007/0276795 A1 * | 11/2007 | Poulsen | 707/2 |
| 2008/0091942 A1 * | 4/2008 | Glatfelter et al. | 713/159 |

* cited by examiner

*Primary Examiner*—F. Ryan Zeender
*Assistant Examiner*—Faris Almatrahi
(74) *Attorney, Agent, or Firm*—Burns & Levinson LLP; Kathleen Chapman

(57) ABSTRACT

A system and method for creating a build set and a BOM from user-selected options from a single master source model.

13 Claims, 5 Drawing Sheets

SYSTEM AND METHOD FOR CREATING A BUILD SET AND BILL OF MATERIALS FROM A MASTER SOURCE MODEL

CROSS REFERENCE TO RELATED APPLICATIONS

This application claims priority under 35 U.S.C. §119 from U.S. Provisional Patent Application Ser. No. 60/893,301 entitled SYSTEM AND METHOD FOR CREATING A BUILD SET AND BILL OF MATERIALS FROM A MASTER SOURCE MODEL, filed on Mar. 6, 2007.

BACKGROUND

What is needed is a mechanism to dynamically create a build set and build of materials from user-selected options from a single master source model.

SUMMARY

The needs set forth above as well as further and other needs and advantages are addressed by the present embodiment. The solutions and advantages of the present embodiment are achieved by the illustrative embodiment described herein below.

For a better understanding of the present embodiment, together with other and further objects thereof, reference is made to the accompanying drawings and detailed description.

DETAILED DESCRIPTION

Figure 1:
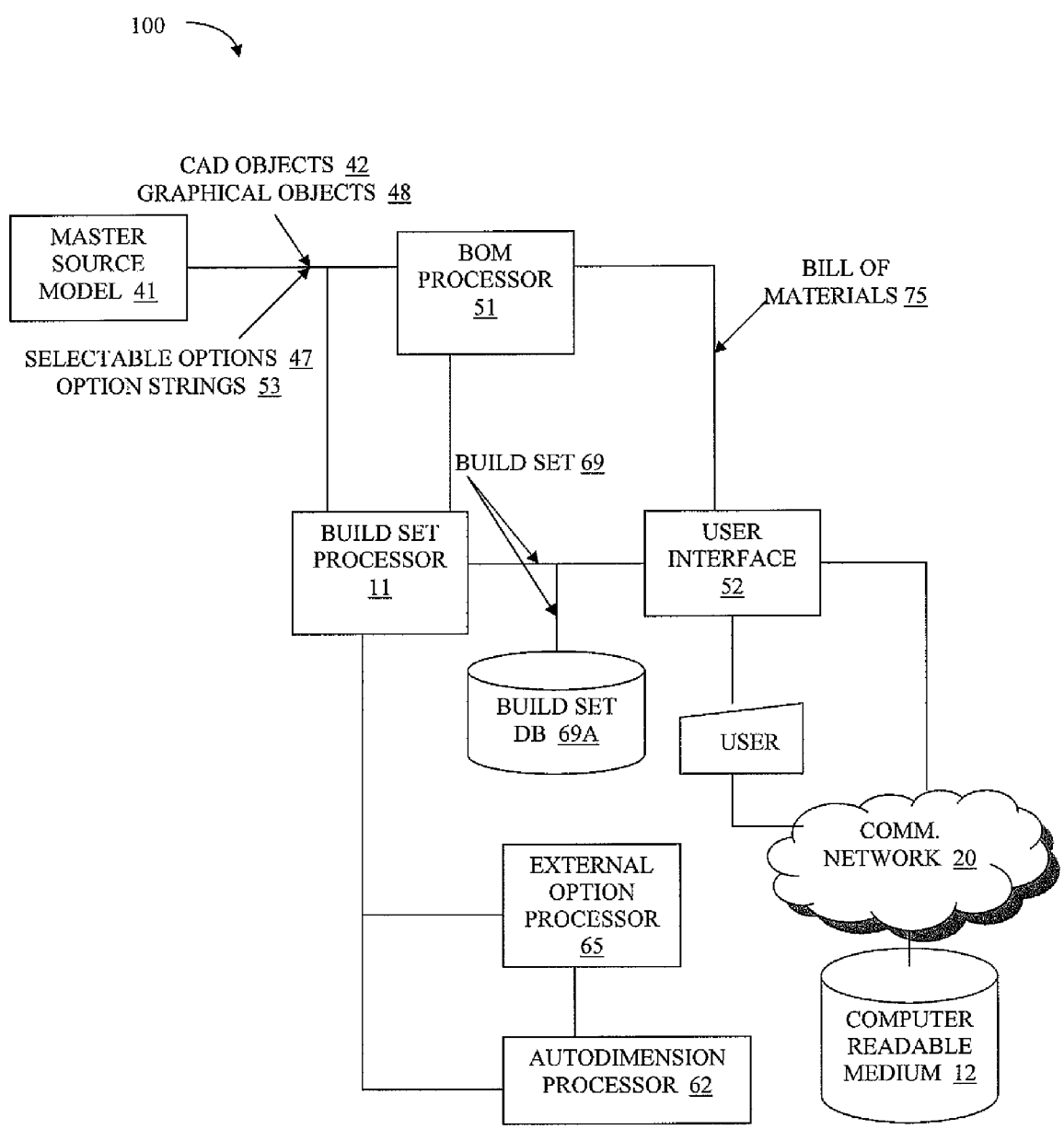
FIG. 1 is a schematic block diagram of the system of the present embodiment.

The present embodiment is now described more fully hereinafter with reference to the accompanying drawings, which present an illustrative, but not limiting, embodiment. The following configuration description is presented for illustrative purposes only. Any computer configuration and architecture satisfying the speed and interface requirements herein described may be suitable for implementing the system and method of the present embodiment.

In the present embodiment, computer-aided design (CAD) drawings including selected options can be created automatically for the purpose of, for example, viewing and pricing a model home with various options. Simple, complex, and intersecting options that are common in, for example, production homes, can be included in the building design created by the present embodiment. A simple option can be, for example, but not limited to, when a washer or a dryer is optionally added to a standard building model. A complex option can be, for example, but not limited to, when a sunroom is added to a standard building model. An intersection option can be, for example, but not limited to, when selected options affect one other, and can include, for example, but not limited to, when a sunroom with a walkout basement is added, or when the elevation is changed in a garage. When certain options are chosen, other parts of the building design could be affected, for example, the foundation, the first floor plan, or the roof plan. The present embodiment accommodates assembling of a selected drawing based on the selected options. Also, groups of graphics from external drawings (drawings that are not the selected drawing) can be included in the selected drawing based on the selected options. Graphical preferences can allow the display of identified selected options, and groups of displayed selected options can be, for example, but not limited to, moved or removed based on graphical preferences of the selected options. The selected options can also change appearance depending on the graphical preferences of the selected option. For example, the selected options can be made to mirror each other, such as a left- or right-handed garage. The dimensions of the drawing can be adjusted after the selected options have been included. Notes and details that correspond to option selection can also be preserved.

After the CAD drawing, or build set, is complete, a BOM can be formulated which can allow comparisons between, for example, the cost of a building constructed according to a CAD drawing having one set of selected options versus the cost of a building constructed according to a CAD drawing having another set of selected options.

Referring now to FIG. 1, system 100 can include, but is not limited to including, master source model 41 configured to provide computer-aided design (CAD) objects 42, graphical objects 48, selectable options 47, and option strings 53 to build set processor 11 and/or build of materials processor 51. Build set processor 11 can be configured to provide a solved build set 69 to user interface 52 and, optionally, build set database 69A, while BOM processor 51 can be configured to provide a BOM 75 to user interface 52. Build set 69 can be modified by executing either or both of external option processor 65, which accesses external drawings, and autodimension processor 62 which dimensions build set 69.

Figure 2:
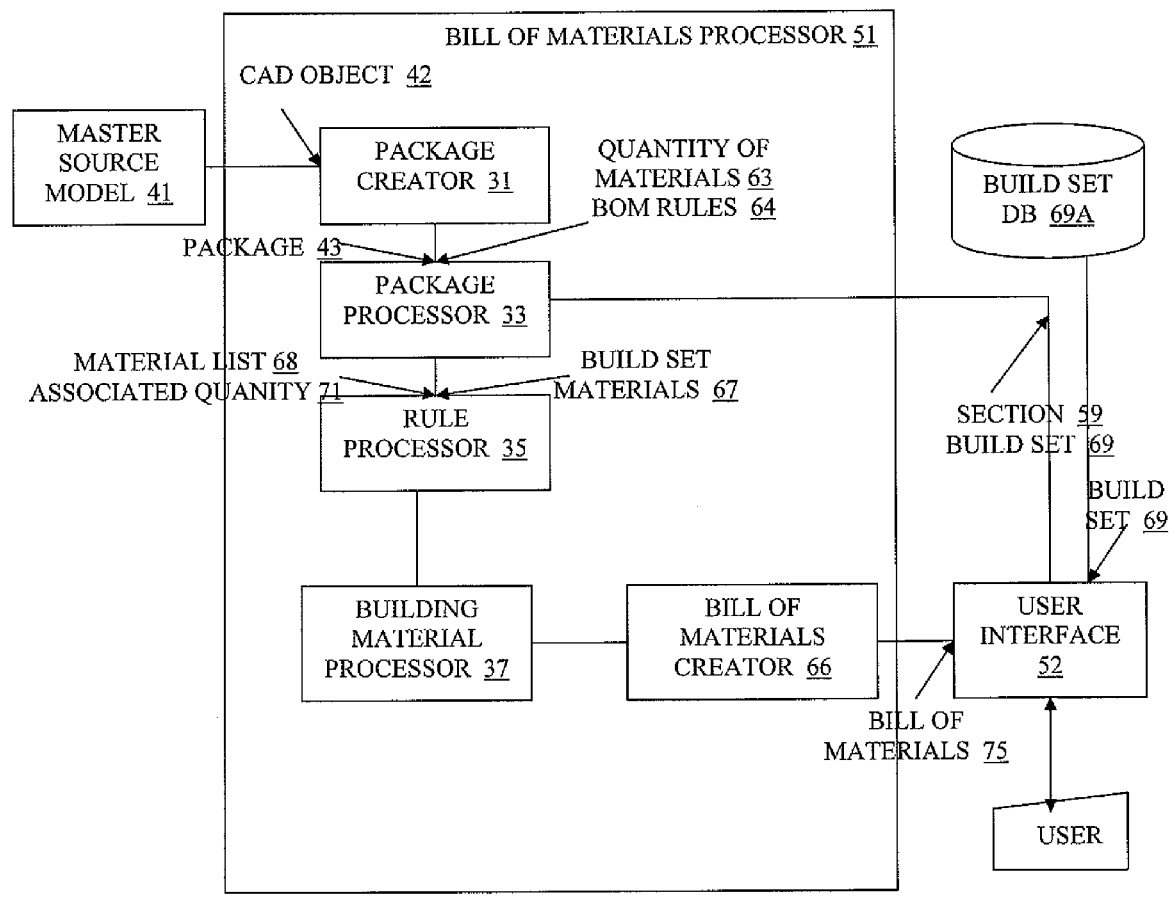
FIG. 2 is a schematic block diagram of the bill of materials (BOM) processor of the present embodiment.

Referring now to FIG. 2, BOM processor 51 can include, but is not limited to including, a package creator 31 configured to create a package 43 for each of the CAD objects 42. Package 43 can include, but is not limited to including, at least one quantity of materials 63, and at least one BOM rule 64. System 100 can further include user interface 52 that can be configured to receive a selection of section 59 of build set 69, and package processor 33 that can be configured to collect CAD objects 42 from section 59, determine packages 43 associated with CAD objects 42, and determine quantities of materials 63 associated with packages 43. System 100 can still further include rule processor 35 that can be configured to apply at least one BOM rule 64 to determine build set materials 67 from quantity of materials 63, building material processor 37 that can be configured to merge similar of build set materials 67 to form material list 68 and associated quantities 71 and remove build set materials 67 from material list 68 that have a zero value for associated quantity 71. System 100 can also include BOM creator 66 configured to apply a rounding rule associated with said package 43 to associated quantities 71, and create BOM 75 from the rounded associated quantities and material list 68.

Figure 3:
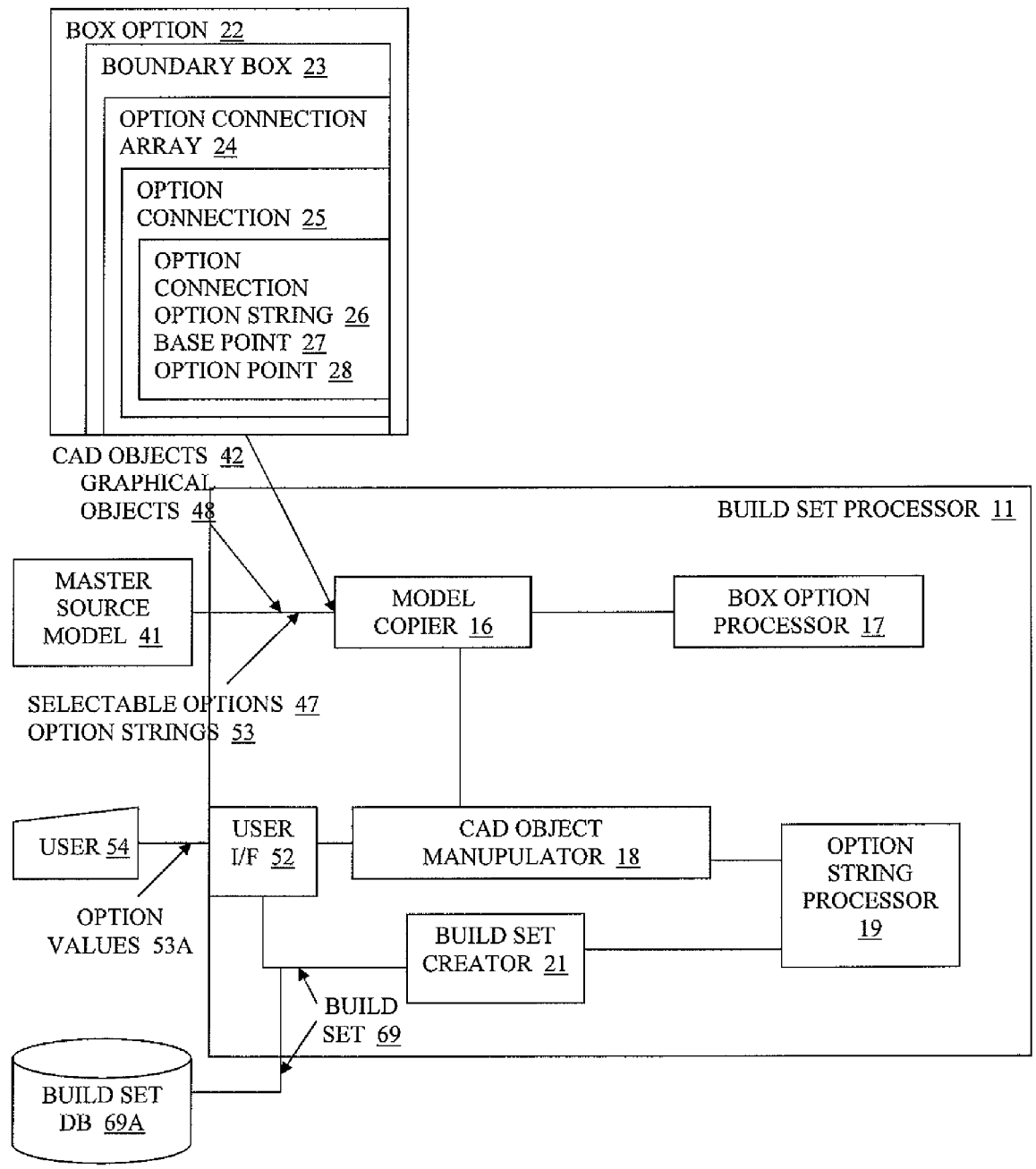
FIG. 3 is a schematic block diagram of the build set processor of the present embodiment.

Referring now to FIG. 3, build set processor 11 for creating a solved build set 69 can include, but is not limited to including, a model copier 16 that can be configured to copy a master source model 41 including a set of CAD objects 42, selectable options 47 associated with said CAD objects 42, option strings 53 associated with said selectable options 47, and graphical objects 48 that have said options strings 53 applied and an option string processor 19. Option string processor 19 can be configured to determine CAD objects 42 having said option strings 53 associated therewith. CAD objects 42 can include, but are not limited to including, CAD objects 42 associated with CAD entities, CAD objects 42 contained within at least one closed line, CAD objects 42 on at least one pre-selected layer, and CAD objects 42 in at least one pre-selected external drawing. Option string processor 19 can be further configured to apply user selected option values to each option string 53 associated with each determined CAD object, and logically evaluate each option string 53. System 100 can still further include CAD object manipulator 18 that can be configured to manipulate by deleting, copying, or modifying properties of each determined CAD object, based on the associated logically evaluated option string. The properties can include, but are not limited to including, origin, orientation, layer, style, and wall height. System 100 can even still further include build set creator 21 that can be configured to combine the manipulated determined CAD objects to produce solved build set 69.

Figure 4:
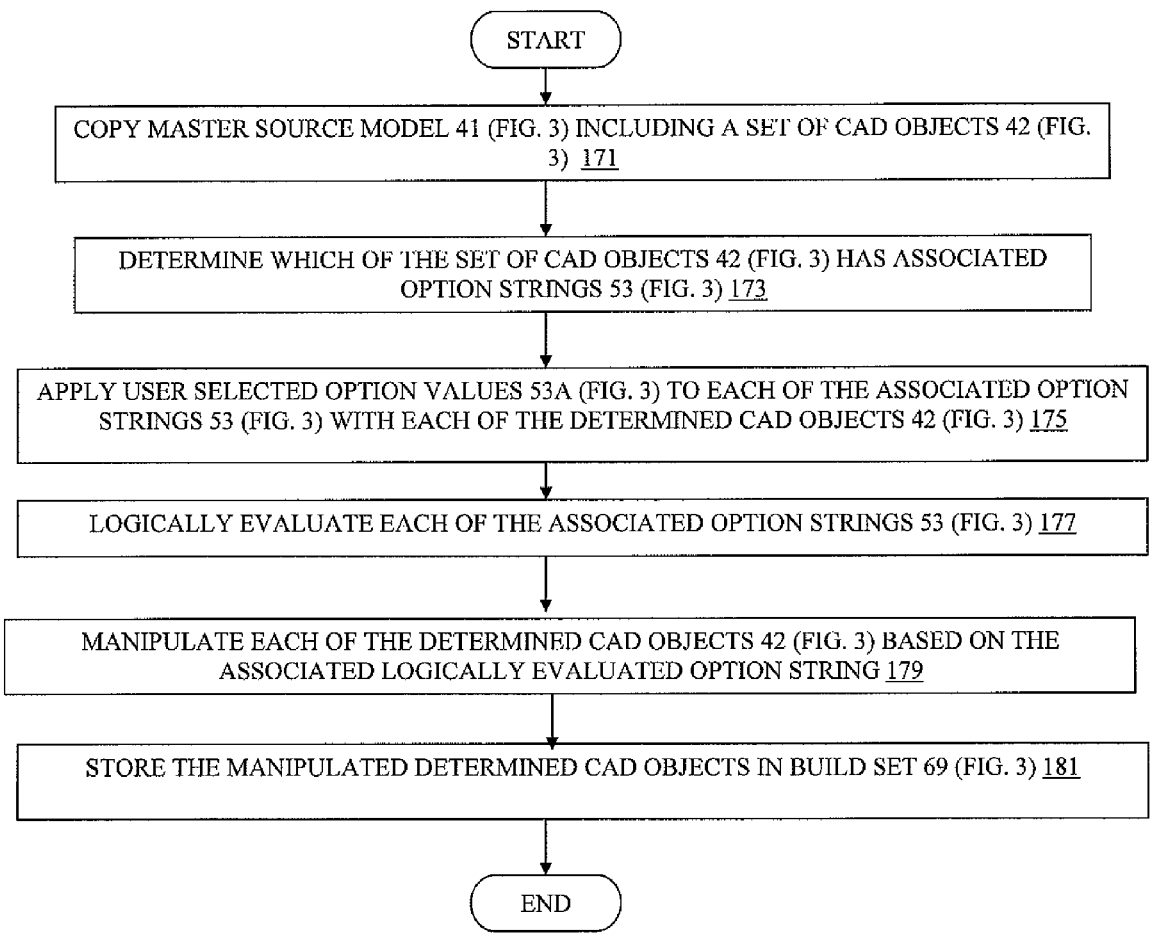
FIG. 4 is a flowchart of the part of the method of the present embodiment that creates a build set.

Referring now primarily to FIGS. 2 and 4, method 150 (FIGS. 4 and 5) for creating build set 69 (FIG. 1) and BOM 75 (FIG. 1) can include, but is not limited to including, the steps of copying 171 (FIG. 4) master source model 41 (FIG. 3) including a set of CAD objects 42 (FIG. 3), determining 173 (FIG. 4) which of the set of CAD objects 42 (FIG. 3) has associated option strings 53 (FIG. 3), applying 175 (FIG. 4) user selected option values 53A (FIG. 3) to each of the associated option strings 53 (FIG. 3) with each of the determined CAD objects 42 (FIG. 3), logically evaluating 177 (FIG. 4) each of the associated option strings 53 (FIG. 3), manipulating 179 (FIG. 4) each of the determined CAD objects 42 (FIG. 3) based on the associated logically evaluated option string, and storing 181 (FIG. 4) the manipulated determined CAD objects in build set 69 (FIG. 3).

Figure 5:
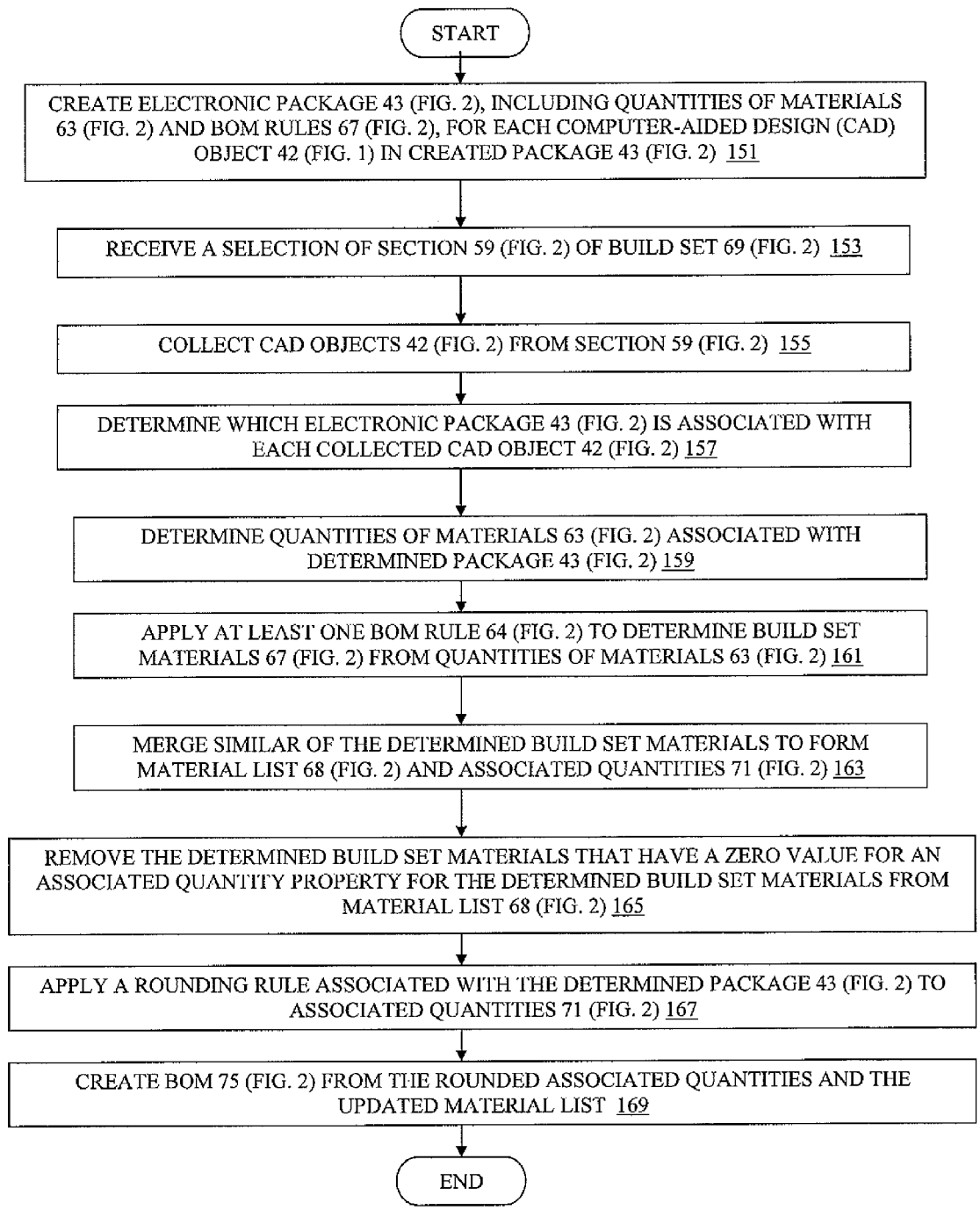
FIG. 5 is a flowchart of the part of the method of the present embodiment that creates a bill of materials.

Referring now primarily to FIGS. 3 and 5, method 150 (FIGS. 4 and 5) can also include the steps of creating 151 (FIG. 5) electronic package 43 (FIG. 2), including quantities of materials 63 (FIG. 2) and BOM rules 67 (FIG. 2), for each computer-aided design (CAD) object 42 (FIG. 1) in created package 43 (FIG. 2), receiving 153 (FIG. 5) a selection of section 59 (FIG. 2) of build set 69 (FIG. 2), collecting 155 (FIG. 5) CAD objects 42 (FIG. 2) from section 59 (FIG. 2), determining 157 (FIG. 5) which electronic package 43 (FIG. 2) is associated with each collected CAD object 42 (FIG. 2), determining 159 (FIG. 5) quantities of materials 63 (FIG. 2) associated with determined package 43 (FIG. 2), applying 161 (FIG. 5) at least one BOM rule 64 (FIG. 2) to determine build set materials 67 (FIG. 2) from quantities of materials 63 (FIG. 2), merging 163 (FIG. 5) similar of the determined build set materials to form material list 68 (FIG. 2) and associated quantities 71 (FIG. 2), removing 165 (FIG. 5) the determined build set materials that have a zero value for an associated quantity property for the determined build set materials from material list 68 (FIG. 2), applying 167 (FIG. 5) a rounding rule associated with the determined package 43 (FIG. 2) to associated quantities 71 (FIG. 2), and creating 169 (FIG. 5) BOM 75 (FIG. 2) from the rounded associated quantities and the updated material list.

Referring primarily to FIG. 3, method 150 (FIGS. 4 and 5) can further optionally include the steps of grouping graphical objects 48 (FIG. 3) associated with CAD objects 42 (FIG. 3) into types, applying each user selected option values 53A (FIG. 3) to each of graphical objects 48 (FIG. 3) according to the type of graphical object 48 (FIG. 3), and if one of the applied user selected option values associated with one of graphical objects 48 (FIG. 3) resolves to "false", deleting one of graphical objects 48 (FIG. 3) from build set 69 (FIG. 3). Method 150 (FIGS. 4 and 5) can even still further optionally include the steps of determining, from master source model 41 (FIG. 3), at least one box option 22 (FIG. 3), including boundary box 23 (FIG. 3) and option connection array 24 (FIG. 3). Option connection array 24 (FIG. 3) can include, but is not limited to including, at least one option connection 25 (FIG. 3). Each option connection 25 (FIG. 3) can include, but is not limited to including, option connection option string 26 (FIG. 3), base point 27 (FIG. 3), and option point 28 (FIG. 3). Method 150 (FIGS. 4 and 5) can also optionally include the steps of evaluating option connection option string 26 (FIG. 3) associated with option connection 25 (FIG. 3) if there is no more than one option connection 25 (FIG. 3), and if evaluated option connection option string resolves to "false", deleting CAD objects 42 (FIG. 3) within box option 22 (FIG. 3) and boundary box 23 (FIG. 3) from build set 69 (FIG. 3). Method 150 (FIGS. 4 and 5) can also include the steps of assigning a depth level to each nested box option within box option 22 (FIG. 3), ordering the nested box options according to the depth level, and solving box option 22 (FIG. 3) by solving each of the ordered nested box options according to the depth level. The step of solving each of the ordered nested box options can include the steps of determining a set of option connections 25 (FIG. 3) associated with box option 22 (FIG. 3), evaluating option connection option string 26 (FIG. 3) associated with each option connection 25 (FIG. 3), ignoring option connection 25 (FIG. 3) if the evaluated option connection option string resolves to "false", copying CAD objects 42 (FIG. 3) contained within boundary box 23 (FIG. 3) from option point 28 (FIG. 3) to base point 27 (FIG. 3) if the evaluated option connection option string resolves to "true", and deleting box option 22 (FIG. 3) after all option connections 25 (FIG. 3) have been evaluated, including CAD objects 42 (FIG. 3) contained within. In method 150 (FIGS. 4 and 5), the step of solving each of the ordered external nested box options can include the steps of determining a set of the at least one external option connections associated with the at least one external box option, evaluating an external option connection option string associated with each of the set of the at least one external option connections, copying the external CAD object contained within the external boundary box from the external option point to an external base point if the evaluated external option string resolves to "true", and deleting the at least one external box option after all the at least one external option connections have been evaluated.

Continuing to refer primarily to FIG. 3, in method 150 (FIGS. 4 and 5), CAD objects 42 (FIG. 3) can include, but are not limited to including, CAD objects 42 (FIG. 3) associated with CAD entities, CAD objects contained within at least one closed line, CAD objects 42 (FIG. 3) on at least one pre-selected layer, CAD objects 42 (FIG. 3) in at least one pre-selected external drawing. In method 150 (FIGS. 4 and 5), the step of manipulating CAD objects 42 (FIG. 3) can include the step of selecting manipulation options from a group that can include, but is not limited to including, deleting the determined CAD object, copying the determined CAD object, and modifying a property of the determined CAD object. The step of manipulating each of the determined external CAD objects can include the step of selecting manipulation options from a group consisting of deleting the determined external CAD object, copying the determined external CAD object, and modifying a property of the determined external CAD object.

In one embodiment, method 150 (FIGS. 4 and 5) can optionally include the steps of determining an external option associated with each of the determined CAD objects, determining external CAD objects having associated external option strings, applying external user selected option values to each of the associated external option strings, and logically evaluating each of the associated external option strings. Method 150 (FIGS. 4 and 5) can further optionally include the steps of manipulating each of the determined external CAD objects based on the associated logically evaluated external option strings, and determining, from the external option, an external box option. The external box option can include, but is not limited to including, an external boundary box and an external option connection array. The external option connection array can include, but is not limited to including, at least one external option connection. Each of the external option connections can include, but is not limited to including, an external option connection option string, an external base point, and an external option point. Method 150 (FIGS. 4 and 5) can still further include the steps of evaluating the external option connection option string associated with the at least one external option connection if there is no more than one of the at least one external option connections, and deleting the external CAD objects within the external box option and the external boundary box if the evaluated external option connection option string resolves to "false". Method 150 (FIGS. 4 and 5) can also include the steps of assigning an external depth level to each external nested box option within the external box option, ordering the external nested box options according to the external depth level, and solving the external box option by solving each of the ordered external nested box options according to the external depth level. Method 150 (FIGS. 4 and 5) can also include the steps of applying the external box option if the evaluated external option connection option string resolves to "true", deleting the external box option if the evaluated external option connection option string resolves to "false", collecting the external CAD objects having external default styles and external style options, evaluating external style option strings associated with the external style objects, changing the external default style of the external CAD object to the external style option associated with the external style option string that resolves to "true", and copying the external CAD objects into the build set. Method 150 (FIGS. 4 and 5) can further optionally include the step of selecting the external CAD objects from a group consisting of the external CAD objects associated with external CAD entities, the external CAD objects contained within at least one external closed line, the external CAD objects on at least one external pre-selected layer, and the external CAD objects in at least one pre-selected external drawing.

In another embodiment, method 150 (FIGS. 4 and 5) can further optionally include the steps of displaying dimensions associated with the CAD objects including points and sides, receiving selections of the displayed dimensions, creating external dimensions for each side of the master source model, wherein the external dimensions include opening positions, wall positions, side dimensions, nodes for the side dimensions, and internal dimension strings, and storing the external dimensions in the build set. The step of creating external dimensions can include the steps of determining the nodes and the internal dimension strings from the master source model, determining the opening positions, the wall positions, and display attributes from pre-selected settings assigned to the master source model, and determining internal dimensions, including internal horizontal dimensions and internal vertical dimensions, by assessing a template dimension manual set by the user, and storing the internal dimensions in the build set.

In another embodiment, system 100 (FIG. 1) and method 150 (FIGS. 4 and 5) can use, for example, AUTODESK®'S AUTOCAD® product through its publicly available Applications Programming Interface (API) for providing CAD objects 42. The API can be used to find and manipulate internal CAD objects 42 such as, for example, lines, walls, and drawings. System 100 (FIG. 1) and method 150 (FIGS. 4 and 5) can also use a database having a standard interface such as, for example, Standard Query Language (SQL), to store data that might need to be accessed outside of the CAD environment. For example, a table of categories that a material is assigned to, a table of a company's entire material (component) catalog, a table of options names available in a company, a table of types of CAD objects 42 collected, for example, walls, door, or windows, a table of possible groups that a company option might fall under, a table of material packages in a company, a table linking components to their associated packages, and a table linking packages with associated sub-packages. In this embodiment, all material that are contained under a package and its sub-packages can be found, and calculation rules can be applied to them. For example, in a drywall package, a calculation rule can be defined in which the area of the drywall package is 144 square feet, while a drywall sheet could have a rule that specifies that one sheet is 48 square feet. A paint package might have no rules assigned, while the paint material itself might include the rule that one gallon covers 400 square feet, and paint labor might include the rule that four gallons/hour can be applied.

Referring to FIGS. 1 and 4-5, method 150 (FIGS. 4 and 5) can be, in whole or in part, implemented electronically. Signals representing actions taken by elements of system 100 (FIG. 1) can travel over electronic communications media and from node to node in a communications network 20 (FIG. 1). Control and data information can be electronically executed and stored on computer-usable media 12 (FIG. 1). Method 150 (FIGS. 4 and 5) can be implemented to execute on a node in computer communications network 20 (FIG. 1). Common forms of computer-usable media 12 (FIG. 1) can include, but are not limited to, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, or any other medium from which a computer can read. From a technological standpoint, a signal or carrier wave (such as used for Internet distribution of software) encoded with functional descriptive material is similar to computer-readable medium 12 (FIG. 1) encoded with functional descriptive material, in that they both create a functional interrelationship with a computer. In other words, a computer is able to execute the encoded functions, regardless of whether the format is a disk or a signal. System 100 (FIG. 1) can include communications network 20 (FIG. 1) that can include at least one node for carrying out method 150 (FIGS. 4 and 5). System 100 (FIG. 1) can be a distributed network (such as a network utilizing a distributed system format such as, but not limited to, DCOM or CORBA) where a computer data signal (such as, but not limited to, signals over the Internet) traveling over communications network 12 (FIG. 1) carrying information capable of causing a computer system in communications network 20 (FIG. 1) to practice methods 150 (FIGS. 4 and 5). Communications network 26 is a conventional network, for example, but not limited to, the networks described in Jacobs, L M.; Binder, R.; Hoversten, E. V., *General purpose packet satellite networks*, Proc. IEEE, Vol. 66, No. 11, 1978, Page(s): 1448-1467 and in Kahn, R E.; Gronemeyer, S. A.; Burchfiel, J.; Kunzelman, R. C., *Advances in packet ratio technology*, Proc. IEEE, Vol. 66, No. 11, 1978, Page(s): 1468-1496 and in similar subsequently developed networks; the signal is modulated and supplemental data is embedded utilizing conventional means, for example, but not limited to, the systems described in G. R. Cooper, C. D. McGillem, *Modern Communications and Spread Spectrum*, ISBN 0-07-012951-7, Ch. 1, pp. 28-44. System 100 (FIG. 1) can include a computer readable medium 28 having instructions embodied therein for the practice of methods 200 (FIGS. 4A, 4B), 300 (FIGS. 5A-5C), 400 (FIG. 6), and 500 (FIG. 7).

Although the description of various embodiments is provided herein, it should be realized there is a wide variety of further and other embodiments possible.

What is claimed is:

1. A method for augmenting a build set and a bill of materials (BOM) comprising the steps of:
   copying a master source model including a set of the CAD objects;
   determining which of the set of the CAD objects has associated option strings;
   applying user selected option values to each of the associated option strings with each of the determined CAD objects;
   logically evaluating, by a processor, each of the associated option strings;
   manipulating each of the determined CAD objects based on the associated logically evaluated option string;
   storing the manipulated determined CAD objects in build set;
   creating an electronic package, including quantities of materials and BOM rules, for each computer-aided design (CAD) object in the created package;
   receiving a selection of a section of the build set;
   collecting the CAD objects from the section;
   determining the electronic package associated with each of the collected CAD objects;
   determining the quantities of materials associated with the determined package;
   applying at least one of the BOM rules to determine build set materials from the quantities of materials;
   merging similar of the determined build set materials to form a material list and associated quantities;
   removing the determined build set materials that have a zero value for an associated quantity property for the determined build set materials from the material list;
   applying a rounding rule associated with the determined package to the associated quantities;
   creating the BOM from the rounded associated quantities and the material list;
   determining an external option associated with each of the determined CAD objects;
   determining external CAD objects having associated external option strings;
   applying external user selected option values to each of the associated external option strings;
   logically evaluating, by an external processor, each of the associated external option strings;
   manipulating each of the determined external CAD objects based on the associated logically evaluated external option strings;
   determining, from the external option, an external box option, wherein the external box option includes an external boundary box and an external option connection array, wherein the external option connection array includes at least one external option connection, wherein each of the at least one external option connection includes an external option connection option string, an external base point, and an external option point;
   evaluating, by the external processor, the external option connection option string associated with the at least one external option connection if there is no more than one of the at least one external option connections;
   deleting the external CAD objects within the external box option and the external boundary box if the evaluated external option connection option string resolves to "false";
   assigning an external depth level to each external nested box option within the external box option;
   ordering the external nested box options according to the external depth level;
   solving the external box option by solving each of the ordered external nested box options according to the external depth level;
   applying the external box option if the evaluated external option connection option string resolves to "true";
   deleting the external box onion if the evaluated external option connection option string resolves to "false";
   collecting the external CAD objects having external default styles and external style options;
   evaluating external style option strings associated with the external style objects;
   changing the external default style of the external CAD object to the external style option associated with the external style option string that resolves to "true"; and
   copying the external CAD objects into the build set.

2. The method as in claim 1 further comprising the step of:
   selecting the external CAD objects from a group consisting of the external CAD objects associated with external CAD entities, the external CAD objects contained within at least one external closed line, the external CAD objects on at least one external pre-selected layer, and the external CAD objects in at least one pre-selected external drawing.

3. The method as in claim 1 wherein said step of manipulating each of the determined external CAD objects comprises the step of:
   selecting manipulation options from a group consisting of deleting the determined external CAD object, copying the determined external CAD object, and modifying a property of the determined external CAD object.

4. The method as in claim 1 wherein said step of solving each of the ordered external nested box options comprises the steps of:
   determining a set of the at least one external option connections associated with the at least one external box option;
   evaluating an external option connection option string associated with each of the set of the at least one external option connections;
   copying the external CAD object contained within the external boundary box from the external option point to an external base point if the evaluated external option string resolves to "true"; and
   deleting the at least one external box option after all the at least one external option connections have been evaluated.

5. The method as in claim 1 further comprising the steps of:
   displaying dimensions associated with the CAD objects including points and sides;
   receiving selections of the displayed dimensions;
   creating external dimensions for each side of the master source model, wherein the external dimensions include opening positions, wall positions, side dimensions, nodes for the side dimensions, and internal dimension strings; and
   storing the external dimensions in the build set.

6. The method as in claim 5 wherein said step of creating external dimensions comprises the steps of:

determining the nodes and the internal dimension strings from the master source model;

determining the opening positions, the wall positions, and display attributes from pre-selected settings assigned to the master source model;

determining internal dimensions, including internal horizontal dimensions and internal vertical dimensions, by assessing a template dimension manual set by the user; and storing the internal dimensions in the build set.

7. The method as in claim 1 wherein the CAD objects are selected from a group consisting of CAD objects associated with CAD entities, CAD objects contained within at least one closed line, CAD objects on at least one pre-selected layer, CAD objects in at least one pre-selected external drawing.

8. The method as in claim 1 wherein said step of manipulating comprises the step of:

selecting manipulation options from a group consisting of deleting the determined CAD object, copying the determined CAD object, and modifying a property of the determined CAD object.

9. The method of claim 1 further comprising the steps of:

grouping graphical objects associated with the CAD objects into types;

applying each of the user selected option values to each of the graphical objects according to the type of the graphical object; and if one of the applied user selected option values associated with one of the graphical objects resolves to "false", deleting one of the graphical objects from the build set.

10. The method as in claim 1 further comprising the steps of:

determining, from the master source model, at least one box option, including a boundary box and an option connection array, wherein the option connection array includes at least one option connection, wherein each of the at least one option connection includes an option connection option string, a base point, and a option point;

evaluating the option connection option string associated with the at least one option connection if there is no more than one of the at least one option connections;

if the evaluated option connection option string resolves to "false", deleting the CAD objects within the at least one box option and the boundary box from the build set;

assigning a depth level to each nested box option within the at least one box option;

ordering the nested box options according to the depth level; and solving the at least one box option by solving each of the ordered nested box options according to the depth level.

11. The method as in claim 10 wherein said step of solving each of the ordered nested box options comprises the steps of:

determining a set of the at least one option connections associated with the at least one box option;

evaluating the option connection option string associated with each of the set of at least one option connections;

ignoring the at least one option connection if the evaluated option connection option string resolves to "false";

copying the CAD objects contained within the boundary box from the option point to the base point if the evaluated option connection option string resolves to "true"; and deleting the at least one box option after all the option connections have been evaluated, including the CAD objects contained within.

12. A system for creating a solved build set and a bill of materials (BOM) comprising:

a BOM processor creating a package for each computer-aided design (CAD) object, said package including quantities of materials and BOM rules, receiving a selection of a section of a build set, collecting said CAD objects from said section, determining said packages associated with said CAD objects, determining said quantities of materials associated with said packages, applying at least one of said BOM rules to determine build set materials from said quantity of materials, merging similar of said build set materials to form a material list and associated quantities, removing said build set materials that have a zero value for the associated quantity from said material list, applying a rounding rule associated with said package to said associated quantities, and creating said BOM from said rounded associated quantities and said material list; and a build set processor copying a master source model including a set of said CAD objects, determining which of said set of said CAD objects has associated option strings, applying user selected option values to each of said associated option strings with each of the determined CAD objects, logically evaluating each of said associated option strings, manipulating each of the determined CAD objects based on the associated logically evaluated option string, and saving the manipulated determined CAD objects in said build set;

an external option processor determining an external option associated with said CAD object and determining external CAD objects having associated external option strings, applying external user selected option values to each said external option string associated with each of the determined external CAD objects, logically evaluating each said external option string, manipulating each of the determined external CAD objects based on the associated logically evaluated external option string, determining, from said external option, an external box option, having an external boundary box, and an external option connection array having at least one external option connection, each at least one external option connection having an external option connection option string, an external base point, and an external option point, evaluating said external option connection option string associated with said at least one external option connection if there is no more than one of said at least one external option connections, deleting said external CAD objects within said external box option and deleting said external boundary box if the evaluated external option connection option string resolves to "false", assigning an external depth level to each said external nested box option within said at least one external box option, ordering said external nested box options according to said external depth level, solving said at least one external box option by solving each of said ordered external nested box options according to said external depth level, applying said extemai box option if the evaluated external option connection option string resolves to "true", deleting said external box option if said evaluated external option connection option string resolves to "false", collecting said external CAD objects having external default styles and external style options, evaluating external style option strings associated with said external style objects, changing said extemat default style of said external CAD object to said external style option associated with said external style option string that resolves to "true", copying said external CAD objects contained on said external drawing into said build set, and closing and deactivating said external drawing, wherein said manipulating each of the determined external CAD objects based on the associated logically evaluated external option string includes deleting the determined external CAD object, copying the determined external CAD object, and modifying a property of the determined external CAD object;

wherein said property includes origin, orientation, layer, style, and wall height;

wherein said solving each of the ordered external nested box options includes determining a set of the at least one external option connections associated with said at least one external box option, evaluating an external option connection option string associated with each of said set of said at least one external option connections, ignoring said at least one external option connection if said evaluated external option connection option string resolves to "false", copying said external CAD object contained within said external boundary box from said external option point to external base point if said evaluated external option string resolves to "true", and deleting said at least one external box option after all said at least one external option connections have been evaluated.

13. The system as in claim 12 further comprising:

an autodimension processor displaying dimensions associated with said CAD objects including points and sides, receiving selections of said dimensions, and creating external dimensions for each said side of said master source model, the external dimensions including opening positions, wall positions, side dimensions, nodes for said side dimensions, and dimension strings;

wherein said creating external dimensions includes determining said nodes and said dimension strings from said master source model, determining positioning and display attributes from pre-selected settings assigned to said master source model, and determining internal dimensions, including internal horizontal dimensions and internal vertical dimensions, by assessing a template dimension manual set.

* * * * *